(12) United States Patent
Raikar et al.

(10) Patent No.: US 12,534,108 B2
(45) Date of Patent: Jan. 27, 2026

(54) SYSTEMS AND METHODS OF FLEET ROAD DE-ICING WITH AUTONOMOUS VEHICLES

(71) Applicant: Torc Robotics, Inc., Blacksburg, VA (US)

(72) Inventors: Akshay Pai Raikar, Austin, TX (US); Joseph R. Fox-Rabinovitz, Austin, TX (US); William Davis, Austin, TX (US); Dakota James Hebert, Austin, TX (US); Justin Yurkanin, Austin, TX (US)

(73) Assignee: TORC ROBOTICS, INC., Blacksburg, VA (US)

( * ) Notice: Subject to any disclaimer, the term of this patent is extended or adjusted under 35 U.S.C. 154(b) by 168 days.

(21) Appl. No.: 18/505,782

(22) Filed: Nov. 9, 2023

(65) Prior Publication Data

US 2025/0153739 A1 May 15, 2025

(51) Int. Cl.
*B60W 60/00* (2020.01)
*B60W 50/06* (2006.01)
(Continued)

(52) U.S. Cl.
CPC ........ *B60W 60/0025* (2020.02); *B60W 50/06* (2013.01); *E01H 10/007* (2013.01); *G06Q 50/40* (2024.01); *B60W 2420/408* (2024.01); *B60W 2552/20* (2020.02); *B60W 2555/20* (2020.02); *B60W 2556/45* (2020.02)

(58) Field of Classification Search
CPC ............. B60W 60/0025; B60W 50/06; B60W 2552/20; B60W 2556/45; B60W 2555/20; B60W 2420/408; G06Q 50/40; E01H 10/007
See application file for complete search history.

(56) References Cited

U.S. PATENT DOCUMENTS 6,246,938 B1  6/2001  Giletta et al.
10,768,003 B2 * 9/2020  Niewiadomski ..........................
                                                G08G 1/096816
(Continued)

FOREIGN PATENT DOCUMENTS

CN  117211219 A  * 12/2023
KR  101581299 B1 * 1/2016  ............. G06Q 50/26

OTHER PUBLICATIONS

CN 117211219 A translated copy (Year: 2023).*
(Continued)

*Primary Examiner* — James J Lee
*Assistant Examiner* — Brandon S Lee
(74) *Attorney, Agent, or Firm* — Armstrong Teasdale LLP (57) ABSTRACT

An autonomous vehicle is provided. The autonomous vehicle includes one or more sensors and an autonomy computing system. The autonomy computing system includes at least one processor in communication with at least one memory device. The at least one processor is programmed to receive sensor data from the one or more sensors, and receive weather-related data from a mission control computing system. The weather-related data include fleet data from autonomous vehicles in a fleet. The fleet includes the autonomous vehicle. The at least one processor is further programmed to determine an icy condition is present based on the sensor data and the fleet data, and determine de-icing strategies based on the icy condition.

21 Claims, 9 Drawing Sheets

(51) Int. Cl.
*E01H 10/00* (2006.01)
*G06Q 50/40* (2024.01)

(56) References Cited

U.S. PATENT DOCUMENTS

| | | |
|---|---|---|
| 2009/0198421 A1 | 8/2009 | Barfod |
| 2016/0281311 A1 | 9/2016 | Jaccoma |
| 2018/0305879 A1 | 10/2018 | Grenier |
| 2023/0256972 A1* | 8/2023 | Roy ........................ B60C 23/20 73/146 |

OTHER PUBLICATIONS

KR 101581299 B1 translated copy (Year: 2016).*
"Snow & Ice Removal," Product web page accessed on Jul. 10, 2023 at URL: https://www.abcotruckequipment.com/snow-ice-removal/.
"SnowEx Liquid Sprayers," Product web page accessed on Jul. 10, 2023 at URL: https://snowexproducts.com/liquids/.
"Camion Liquid De-Icing Systems," Product web page accessed on Jul. 10, 2023 at URL: https://www.camionsystems.com/.
Laura Fay et al., "Alternative Methods for Deicing," Task 6 Final Report, May 14, 2020, Clear Roads & Minnesota Department of Transportation, St. Paul, MN.

* cited by examiner

SYSTEMS AND METHODS OF FLEET ROAD DE-ICING WITH AUTONOMOUS VEHICLES

TECHNICAL FIELD

The field of the disclosure relates generally to autonomous vehicles and, more specifically, road de-icing with autonomous vehicles.

BACKGROUND OF THE INVENTION

Over-application of de-icing material to roads due to unreliable meteorological predictions may cause environmental damage, speed deterioration of vehicles, and lead to an increased financial burden on state or local administrators from the cost of the material. Under-application of de-icing material is problematic because the need of reducing safety risks from icy conditions is not met. Accordingly, it is desirable to improve the application of de-icing material.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed autonomous vehicle includes one or more sensors and an autonomy computing system. The autonomy computing system includes at least one processor in communication with at least one memory device. The at least one processor is programmed to receive sensor data from the one or more sensors, and receive weather-related data from a mission control computing system. The weather-related data include fleet data from autonomous vehicles in a fleet. The fleet includes the autonomous vehicle. The at least one processor is further programmed to determine an icy condition is present based on the sensor data and the fleet data, and determine de-icing strategies based on the icy condition.

In another aspect, the disclosed autonomy computing system of an autonomous vehicle includes at least one processor in communication with at least one memory device. The at least one processor is programmed to receive sensor data from one or more sensors of an autonomous vehicle, and receive weather-related data from a mission control computing system. The weather-related data include fleet data from autonomous vehicles in a fleet. The fleet includes the autonomous vehicle. The at least one processor is also programmed to determine an icy condition is present based on the sensor data and the fleet data, and determine de-icing strategies based on the icy condition.

In yet another aspect, the disclosed method of de-icing roads using an autonomous vehicle includes receiving sensor data from one or more sensors of an autonomous vehicle, and receiving weather-related data from a mission control computing system. The weather-related data include fleet data from autonomous vehicles in a fleet. The fleet includes the autonomous vehicle. The method also includes determining whether an icy condition is present based on the sensor data and the fleet data, and determining de-icing strategies based on determination of the icy condition.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

Systems and methods for de-icing roads with autonomous vehicles are provided. As used herein, the term "autonomous" includes both fully-autonomous, such as self-driving or driverless, and semi-autonomous. Autonomous semi-trucks are described herein as examples for illustration purposes only. Systems and methods described herein may be applied to other types of vehicles such as buses, passenger vehicles, or other types of trucks.

As used herein, a de-icing material refers generally to a material that is used to reduce risks on a road in an icy condition, and may include salt, sand, and/or other de-icing chemicals such as glycol-based chemicals. Salt may be calcium, sodium, and/or magnesium chloride. An icy condition includes a weather condition in which precipitation of snow and/or ice is imminent, ongoing, or has recently occurred, a road condition where ice and/or snow is present on the road, or both. In known methods, de-icing materials such as salt or sand are typically applied once, either in advance of the precipitation or after. De-icing materials are often applied by human operators using manually operated vehicles such as plows or other equipment. Known methods of application are often inefficient and result in over-application, which causes environmental damage, unnecessary deterioration and corrosion to vehicles from the de-icing materials, and increased financial burden to state or local administrators. Known methods of application may also result in under-application, where the safety risks from icy conditions are not reduced to desired levels. Part of the inefficiency is caused by lack of human resources to traverse routes multiple times, and the tendency to over-react to potentially inaccurate predictions instead of to actual weather conditions.

In contrast, the disclosed systems and methods increase the efficiency in de-icing of roads by using a fleet of autonomous vehicles. By employing a fleet of autonomous vehicles, precision of applying de-icing materials is increased, where the application is adaptively adjusted based on data from vehicles in the fleet and real-time sensor data. Information from other vehicles in the fleet is advantageous in detecting conditions that are otherwise difficult to ascertain based only on sensor data of a single autonomous vehicle, such as detecting iciness or the de-icing material already on the road.

Figure 1:
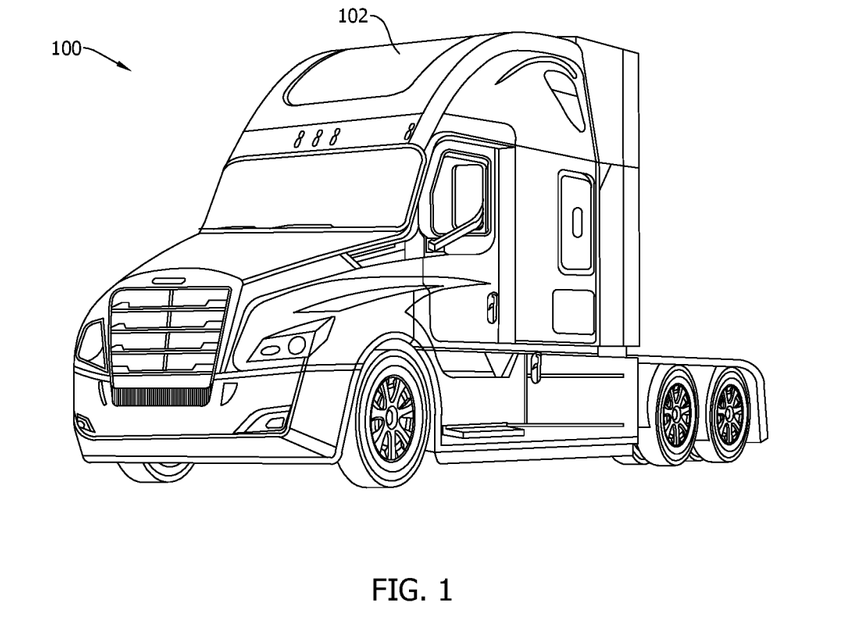
FIG. 1 is a schematic diagram of an autonomous vehicle.

FIG. 1 is a schematic diagram of an autonomous vehicle 100 configured to de-ice roads. In the example embodiment, autonomous vehicle 100 includes a tractor 102. Tractor 102 may be further connected to a single or tandem trailer (not shown) to transport the trailers and their cargo to a desired location.

Figure 2:
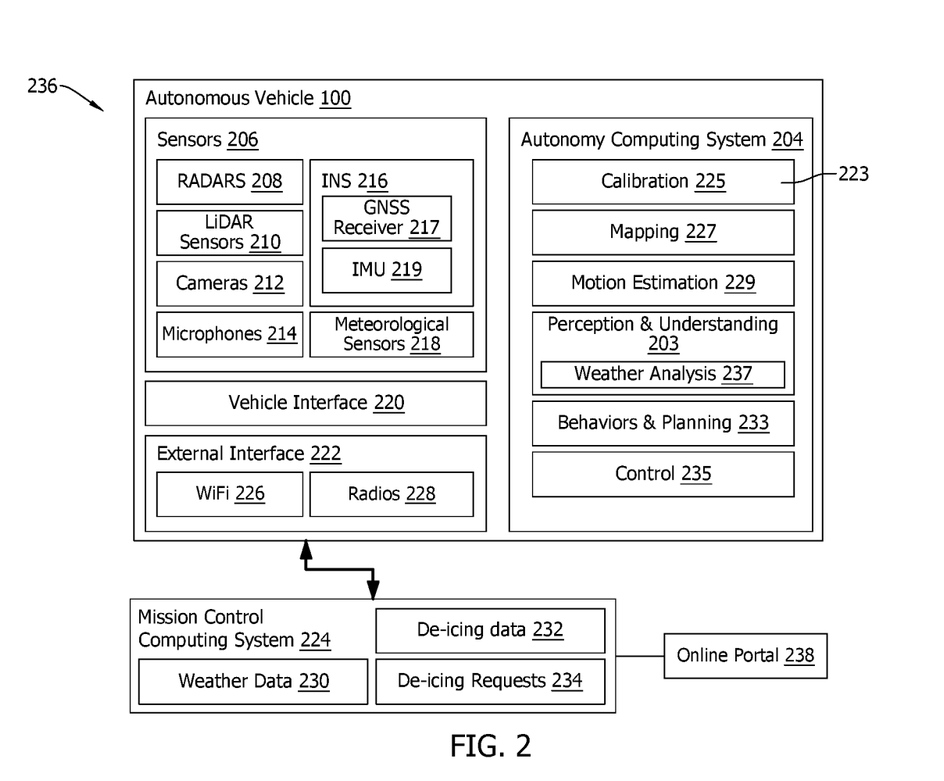
FIG. 2 is a block diagram of an autonomous driving system.

FIG. 2 is a block diagram of an autonomous driving system 236, including autonomous vehicle 100 shown in FIG. 1. In one embodiment of the disclosed systems and methods, autonomous driving system 236 includes a mission control computing system 224 and autonomous vehicle 100.

Autonomous driving system 236 includes a fleet of one or more autonomous vehicles 100. The fleet of autonomous vehicles 100 generally travels in a limited geographic region or along a given set of routes. For example, the fleet may travel within a given county, or between location A and location B, along the same travel trajectories.

In the example embodiment, mission control computing system 224 communicates with autonomous vehicle 100. Mission control computing system 224 may transmit control commands and/or data to autonomous vehicle 100, such as weather data 230, de-icing data 232, and de-icing requests 234. Mission control computing system 224 may transmit the overarching strategy of de-icing, such as areas to be de-iced and the de-icing material, and travel trajectories to autonomous vehicle 100. Mission control computing system 224 determines the types of the de-icing materials to be loaded on autonomous vehicle 100 based on environmental conditions and legal requirements. For example, autonomous vehicle 100 may travel to a location that limits the de-icing material to one particular substance, such as only sand or only salt. Mission control computing system 224 is configured to select the particular substance as the de-icing material and send the information to autonomous vehicle 100. In some situations, data on current conditions such as conditions on city roads may be available and transmitted from mission control computing system 224 to autonomous vehicle 100.

Not limited to communicating with a single autonomous vehicle 100, mission control computing system 224 communicates with and controls the fleet. Mission control computing system 224 receives data from autonomous vehicles 100 in the fleet and sends control commands and/or data to autonomous vehicles 100 in the fleet.

In the example embodiment, autonomous vehicle 100 further includes sensors 206. Sensors 206 may include radio detection and ranging (RADAR) devices 208, light detection and ranging (LiDAR) sensors 210, cameras 212, and acoustic sensors 214. Sensors 206 may further include an inertial navigation system (INS) 216 configured to determine states such as the location, orientation, and velocity of autonomous vehicle 100. INS 216 may include at least one global navigation satellite system (GNSS) receiver 217 configured to provide positioning, navigation, and timing using satellites. INS 216 also includes an inertial measurement unit (IMU) 219 configured to measure motion properties such as the angular velocity, linear acceleration, and/or orientation of autonomous vehicle 100. Sensors 206 may further include meteorological sensors 218. Meteorological sensors 218 may include a temperature sensor, a humidity sensor, an anemometer, pitot tubes, a barometer, a precipitation sensor, or a combination thereof. Meteorological sensors 218 are used to acquire meteorological data, such as the humidity, atmospheric pressure, wind, and/or precipitation, of the ambient environment of autonomous vehicle 100.

Autonomous vehicle 100 further includes vehicle interface 220, which interfaces with an engine control unit (ECU) (not shown) of autonomous vehicle 100 to control the operation of the autonomous vehicle 100 such as acceleration and steering. Vehicle interface 220 may be used to control the operation of a de-icing dispenser 502 (see FIGS. 5-7 described later).

Autonomous vehicle 100 may further include external interface 222 configured to communicate with external devices or systems such as another vehicle or mission control computing system 224. External interface 222 may include wi-fi 226, other radios 228 such as Bluetooth, or other suitable wired or wireless transceivers such as cellular communication devices. Data detected by sensors 206 may be transmitted to mission control computing system 224 via external interface 222.

Autonomous vehicle 100 further includes an autonomy computing system 204. Autonomy computing system 204 controls the driving of autonomous vehicle 100 through vehicle interface 220. Autonomy computing system 204 operates autonomous vehicle 100 to de-ice roads, provide services to the municipality, and/or ensure the safety of autonomous vehicle 100.

In one embodiment, autonomy computing system 204 includes modules 223 for performing various functions. Modules 223 may include a calibration module 225, a mapping module 227, a motion estimation module 229, perception and understanding module 203, behaviors and planning module 233, and a control module 235. Perception and understanding module 203 may include a weather analysis submodule 237 configured to analyze weather conditions based on data from sensors 206 and/or weather data 230 received from mission control computing system 224. Modules 223 and submodules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

In the example embodiment, based on the data collected from sensors 206, autonomy computing system 204 and, more specifically, perception and understanding module 203 senses the environment surrounding autonomous vehicle

100 by gathering and interpreting sensor data. Perception and understanding module 203 interprets the sensed environment by identifying and classifying objects or groups of objects in the environment. For example, perception and understanding module 203 in combination with various sensors 206 (e.g., LiDAR, camera, radar, etc.) of autonomous vehicle 100 may identify one or more objects (e.g., pedestrians, vehicles, debris, etc.) and features of a roadway (e.g., lane lines) around autonomous vehicle 100, and classify the objects in the road distinctly.

In one embodiment, a method of controlling an autonomous vehicle, such as autonomous vehicle 100, includes collecting perception data representing a perceived environment of autonomous vehicle 100 using perception and understanding module 203, comparing the perception data collected with digital map data, and modifying operation of the vehicle based on an amount of difference between the perception data and the digital map data. Perception data may include sensor data from sensors 206, such as cameras 212, LiDAR sensors 210, GNSS receiver 217, and/or IMU 219.

Mapping module 227 receives perception data that can be compared to one or more digital maps stored in mapping module 227 to determine where autonomous vehicle 100 is in the world and/or or where autonomous vehicle 100 is on the digital map(s). In particular, mapping module 227 may receive perception data from perception and understanding module 203 and/or from the various sensors sensing the environment surrounding autonomous vehicle 100, and may correlate features of the sensed environment with details (e.g., digital representations of the features of the sensed environment) on the one or more digital maps. The digital map may have various levels of detail and can be, for example, a raster map, or a vector map. The digital maps may be stored locally on autonomous vehicle 100 and/or stored and accessed remotely. In at least one embodiment, autonomous vehicle 100 deploys with sufficient stored information in one or more digital map files to complete a mission without connection to an external network during the mission.

In the example embodiment, behaviors and planning module 233 and control module 235 plan and implement one or more behavior-based trajectories to operate autonomous vehicle 100 similar to a human driver-based operation. The behaviors and planning module 233 and control module 235 use inputs from the perception and understanding module 203 or mapping module 227 to generate trajectories or other planned behaviors. For example, behavior and planning module 233 may generate potential trajectories or actions and select one or more of the trajectories to follow or enact as the vehicle travels along the road. The trajectories may be generated based on proper (i.e., legal, customary, and/or safe) interaction with other static and dynamic objects in the environment. Behaviors and planning module 233 may generate local objectives (e.g., following rules or restrictions) such as, for example, lane changes, stopping at stop signs, etc. Additionally, behavior and planning module 233 may be communicatively coupled to, include, or otherwise interact with motion planners, which may generate paths and/or actions to achieve local objectives. Local objectives may include, for example, reaching a goal location while avoiding obstacle collisions.

In the example embodiment, based on the data collected from sensors 206, autonomy computing system 204 is configured to perform calibration, analysis, and planning, and control the operation and performance of autonomous vehicle 100. For example, autonomy computing system 204 is configured to estimate the motion of autonomous vehicle 100, calibrate the speed and moving direction of autonomous vehicle 100, and provide a map of surroundings of autonomous vehicle 100 and/or the travel routes of autonomous vehicle 100. Autonomy computing system 204 is configured to analyze the behaviors of autonomous vehicle 100 and generate and adjust the trajectory plans for the autonomous vehicle 100 based on the behaviors computed by behaviors and planning module 233.

In the example embodiment, the processed data and results may be transmitted to mission control computing system 224 in managing the fleet. Mission control computing system 224 may send weather-related data to autonomous vehicle 100. Weather-related data include data from a variety of sources, and may include fleet data, weather data/meteorological data, data from a municipality, legal requirements on measures for handling incremental weather conditions, and other data related to deposition of de-icing materials. Fleet data include data from vehicles in the fleet, such as de-icing data and sensor data from vehicles in the fleet. De-icing data 232 include data associated with de-icing such as whether application is performed by an autonomous vehicle, the de-icing materials applied, de-icing patterns such as the timing and frequency of deposition, the lanes and roads where the de-icing materials have been deposited, and/or the rate of dispensing. Weather data 230 may be meteorological data received from weather services and/or meteorological data uploaded from vehicles in the fleet. Weather data 230 may include rates and types of precipitation, geographical areas having precipitation, forecasting of precipitation, temperature, humidity, atmospheric pressure, wind, and/or cloud cover. Mission control computing system 224 may automatically generate de-icing requests 234 based on the weather data 230 and de-icing data 232. Additionally or alternatively, de-icing requests 234 may be placed by a user. De-icing requests 234 include requests to de-ice a geographical area.

In the example embodiment, upon receipt of a de-icing request 234 from mission control computing system 224, autonomy computing system 204 is configured to execute the de-icing request 234. Autonomy computing system 204 is configured to determine de-icing strategies. De-icing strategies include dispensing strategies such as whether and/or when to apply de-icing material, which de-icing material to use, and how much de-icing material to deposit on the road, and at what rate to dispense the material. De-icing strategies also include travel trajectories during dispensing such as the lane to travel on during dispensing.

In the example embodiment, the input data to autonomy computing system 204 in determining de-icing strategies may include sensor data directly from sensors 206, meteorological data from meteorological services, traffic data detected by sensors 206, and road conditions based on the sensor data. Autonomy computing system 204 may receive data from mission control computing system 224, such as sensor data from other vehicles in the fleet, weather/meteorological data from other vehicles and/or weather services, and de-icing data of other vehicles. Autonomy computing system 204 may also receive information or commands related to de-icing activities from mission control computing system 224, such as information related to overall de-icing and preferred travel trajectories of autonomous vehicle 100.

Autonomy computing system 204 determines the conditions of the road, based on sensor data and actions taken by other vehicles of the fleet and/or other actors. Autonomy computing system 204 is configured to analyze and determine whether there is precipitation in the surrounding area, the road conditions in real time, and the traffic around autonomous vehicle 100. Autonomy computing system 204 is configured to output de-icing strategies and control de-icing. The de-icing strategies may be adjusted in real time based on the input data.

In the example embodiment, autonomy computing system 204 is configured to determine icing patterns on the roads traveled by the fleet using meteorological data and data directly observed and collected by vehicles in the fleet. Effectiveness of on-going de-icing measures may be determined by direct observation of road conditions by autonomous vehicles 100. Autonomy computing system 204 is configured to account for current and predicted temperatures, traffic conditions, and precipitation patterns. Deposition of de-icing materials may be scheduled and adjusted to minimize wastage while optimizing effectiveness. Data collected during de-icing activities may be used to further train or refine the algorithms used to control de-icing activities. Accordingly, the accuracy of de-icing may be increased by the increase in the count and frequency of vehicle passages over a given route, as the de-icing strategies and algorithms are repeatedly fine-tuned.

Autonomy computing system 204 is configured to determine travel trajectories based on the weather-related data. For example, autonomy computing system 204 may determine a lane of travel for autonomous vehicle 100. If deposition of de-icing materials is warranted, the lane to be traveled may be chosen in a variety of ways, including a lane that has not been traveled by previous vehicles in the fleet, a lane that has not had de-icing materials deposited in it, a lane that has not had de-icing materials deposited in it at least recently, a lane that has a particular level of being de-iced even if it has had de-icing materials deposited in it, or the like. In the case where the lane is chosen as a lane that has not been traveled by previous vehicles in the fleet, the operation mode is opposite to the typical operation mode of autonomous vehicle 100, where autonomous vehicle 100 travels on the lane on which previous vehicles in the fleet have traveled and tends to show suitability for travel.

In the example embodiment, autonomy computing system 204 is configured to transmit the statuses of de-icing such as whether de-icing has started or completed or what part of the routes have been traversed. The statuses may be transmitted at intervals or in real-time. The intervals may be preset or user-defined by a user such as personnel working for a municipality or government entity. Mission control computing system 224 may relay the information to the user.

In the example embodiment, autonomous driving system 236 further includes an online portal 238. Online portal 238 may be a web-based application or an app that can be installed on a portable computing device such as a cellular phone or a tablet. Online portal 238 may be accessed for requesting de-icing services, monitoring the progress of application of de-icing material, and receiving notification regarding the requests, statuses, and recommendation of de-icing strategies such as timing, geographical trajectories, and de-icing types, amounts, and frequencies.

Figure 3:
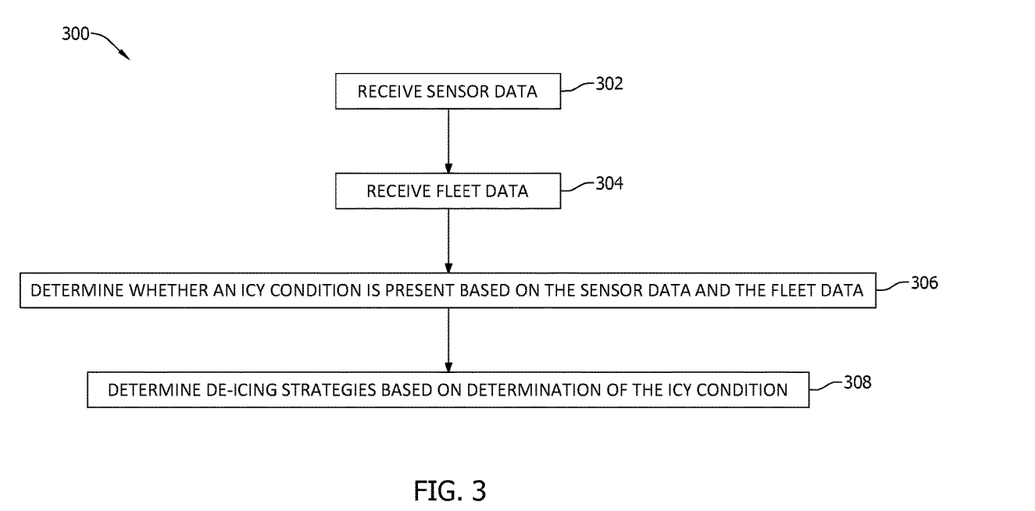
FIG. 3 is a flow chart of an example method of road de-icing.

FIG. 3 is a flow chart of an example method 300 of road de-icing. In the example embodiment, method 300 includes receiving 302 sensor data from the sensors 206. Method 300 also includes receiving 304 fleet data from mission control computing system 224. Method 300 also includes determining 306 whether an icy condition is present based on the sensor data and the fleet data. Method 300 further includes determining 308 de-icing strategies based on the determination of the icy condition.

Figure 4:
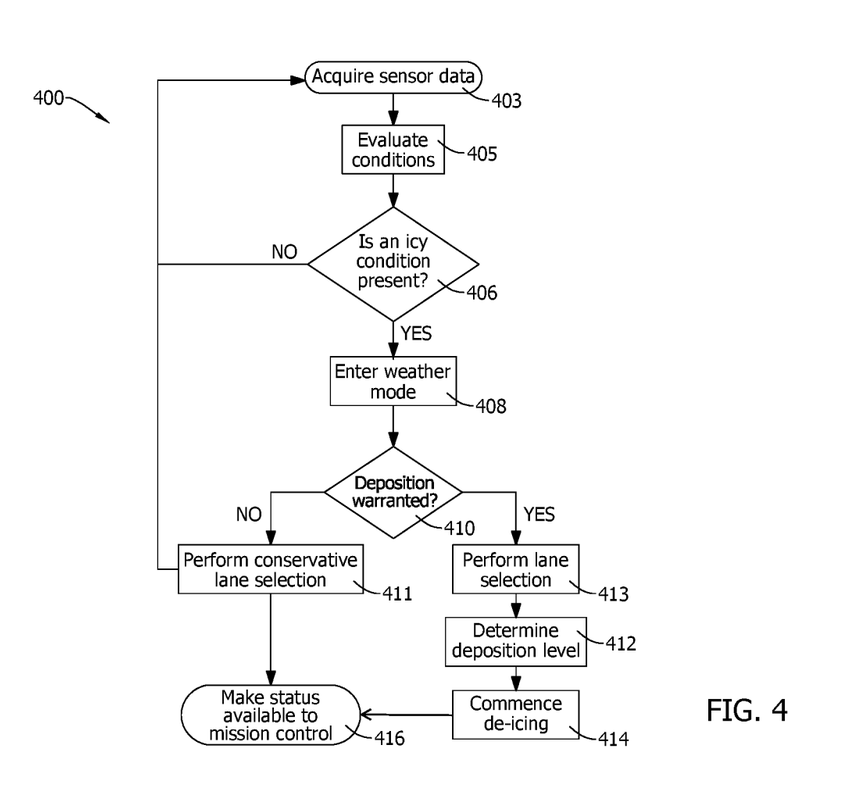
FIG. 4 is a flow chart of an example decision tree in road de-icing.

FIG. 4 is an example decision tree 400 in the example method of road de-icing 300. In the example embodiment, sensor data are acquired 403. Sensor data may include meteorological data, RADAR data, LiDAR data, infrared data, images and/or videos acquired by cameras 212, velocity and acceleration of autonomous vehicle 100, and/or geographical locations of autonomous vehicle 100.

Following the acquisition of the sensor data, environmental conditions, such as the road, traffic, and weather, are evaluated 405 based on the sensor data. Autonomy computing system 204 may determine whether and/or to what extent the road is covered with snow and/or ice based on images, radar, infrared data, ultrasound data, and/or LiDAR data. For example, snow or ice may appear different from the road in images and whether and/or to what extent the road is covered by snow or ice may be determined based on the contrast or coloring of the images. Snow or ice may also appear different from the road in radar, infrared, and/or LiDAR data due to their reflection and/or absorption properties of electromagnetic waves or light different from the road. Geometrical conditions of snow/ice such as the thickness of snow/ice may be determined based on the LiDAR data such as geometrical distribution of the light. In some cases, the autonomy computing system 204 may use one or more trained machine learning models to analyze sensor data to determine whether there is snow or ice on the road surface. Autonomy computing system 204 may also determine the type of de-icing materials that have been deposited on the road, such as sand by examining the images. Salt may be detected by reflectance and absorption properties, or determining the presence of water versus ice and comparing it to the expected value at the temperature of the substance. Other de-icing materials such as ethylene glycol compounds may be detected using the mechanisms similar to those for detecting salt.

In various embodiments, the autonomy computing system 204 may use the sensor data for other purposes besides de-icing activities, including to change the behavior (e.g., speed, lane of travel, etc.) of the autonomous vehicle 100 for reasons unrelated to de-icing activities. As an example, the autonomy computing system 204 may use the sensor data to determine the presence and/or behavior of traffic around autonomous vehicle 100 and alter its behavior to ensure the safety of autonomous vehicle 100, cargo and passengers on autonomous vehicle 100, and surrounding road users.

In the example embodiment, evaluating 405 conditions may include determining weather conditions. The autonomy computing system 204 may be configured to determine weather conditions in real time. Determining weather conditions may include determining whether precipitation is falling along with the type and amount of the precipitation. Additionally or alternatively, determining weather conditions may include determining whether conditions exist that may result in ice formation, including freezing temperature, fog or freezing fog, frost formation conditions, and the like. The determination may be based on images, radar, LiDAR, and/or meteorological data.

In some cases, current sensor data alone may be insufficient for determining the level of iciness of a road. As used herein, a level of iciness indicates the level of snow and/or ice on the road. Systems and methods described herein are advantageous in detecting the level of iciness by using information from the fleet. Historical sensor data of the fleet may be used to train a machine-learning model for predicting a level of iciness based on the current sensor data of autonomous vehicle 100. The machine learning model may be supervised or unsupervised. The ground truth for the supervised training may be confirmed levels of iciness associated with the historical sensor data. The ground truth may also include weather data and/or images from weather services and/or satellites. Historical sensor data such as LiDAR data, images from camera 212, infrared data, and meteorological data may be input into the machine learning model during training. The trained machine learning model is used to predict the level of iciness based on the current sensor data acquired by autonomous vehicle 100 in real time. The trained machine learning model may be included in autonomy computing system 204.

Furthermore, when a road or lane is traveled relatively frequently, the road or lane likely is relatively not icy. Therefore, data from autonomous vehicles 100 in the fleet, such as travel trajectories and timing, may be used to determine the level of iciness. If a road or lane is traveled by multiple vehicles in recent time spans, the level of iciness of the road or lane is likely low.

The systems and methods described herein are advantageous in determining the de-icing material on the road using the fleet data. For example, salt may be difficult to detect based on sensor data. Fleet data may be used to determine the de-icing material that has already been deposited on the road. For example, if the fleet data indicate other vehicles in the fleet have been depositing sand on the road, the autonomy computing system 204 determines that the de-icing material sensed by the autonomous vehicle 100 is sand. Similarly, if the fleet data indicate the de-icing material is salt, the autonomy computing system 204 determines that the de-icing material sensed by the autonomous vehicle 100 is salt. The application of the de-icing material may be adjusted based on the determination of the de-icing material on the road. For example, application of salt by autonomous vehicle 100 may be adjusted based on the determination whether salt has already been applied on the road, thereby reducing the amount of de-icing materials deposited and reducing pollution to the environment.

In the example embodiment, autonomous vehicle 100 is also configured to predict whether precipitation is imminent, which may be used to determine whether to de-ice the road. In known methods, de-icing materials are typically preemptively deposited on the road far ahead of precipitation, due to the unpredictability of weather. For example, de-icing materials may be deposited hours or a day before a prediction of precipitation from weather services, after the precipitation, and in a fixed amount. The systems and methods described herein are advantageous in narrowing the window of de-icing in response to real-time data on weather, roads, and traffic and adjusting de-icing based on the real-time data, thereby reducing likelihood of over-deposition or under-deposition of de-icing materials, which may enhance road safety while reducing pollution and increasing the efficiency of de-icing operations.

In the example embodiment, whether an icy condition is present is determined 406. An icy condition may require de-icing measures, such as depositing de-icing material on the road. If an icy condition is not present, decision tree 400 goes back to acquiring 403 sensor data, and monitoring of conditions continues. If an icy condition is present, decision tree 400 goes to entering 408 a weather mode, under which autonomous vehicle 100 operates. For example, weather is considered in determining the travel patterns of autonomous vehicle 100.

In the example embodiment, the autonomous vehicle determines 410 whether deposition of de-icing material is warranted. If deposition of de-icing material is not warranted, regular operation of the autonomous vehicle 100 continues 411. In some embodiments, regular operation includes making a conservative lane selection. The lane has the lowest level of iciness may be selected. A lane previously traveled by other vehicles in the fleet may be selected because the lane has a higher likelihood of being safe than lanes less traveled. For example, previous vehicles may have deposited de-icing materials or less precipitation may be present on the road surface in the lane, compared to other lanes. If deposition of de-icing material is warranted, a regular lane selection may be overridden, and instead a lane less traveled is selected 413, on which de-icing materials have not been deposited by previous vehicles or, if de-icing materials have been deposited, more de-icing materials are preferred.

In some embodiments, the autonomy computing system 204 determines the selection of a de-icing material, such as selection between salt or sand. The selection of de-icing material may be based on fleet data, which may be limited to the de-icing material permitted by the local law. In areas where both salt and sand are permitted, the selection of de-icing material may be based on the sensor data. For example, if the sensor data indicate ice on the road, the autonomy computing system 204 may determine to select sand to increase traction on the road. If the sensor data indicate snow on the road, the autonomy computing system 204 may determine to select salt to melt snow.

In the example embodiment, the autonomous vehicle determines 412 the level of deposition of de-icing material. Autonomy computing system 204 is configured to determine the level of deposition based on the weather and road conditions. For example, if precipitation is severe and de-icing materials have not previously been deposited, the deposition level may be relatively high. In some embodiments, based on the traffic conditions, autonomous computing system 204 adjusts the travel speed and trajectories of autonomous vehicle 100 and the amount and/or speed of dispensing. Once de-icing strategies are determined, autonomy computing system 204 is configured to commence 414 de-icing, such as activating de-icing of the autonomous vehicle. De-icing is controlled by autonomy computing system 204 according to the de-icing strategies.

In the example embodiment, autonomy computing system 204 uploads 416 deposition strategies and statuses to mission control computing system 224. Other data of autonomous vehicle 100, such as sensor data and travel trajectories of autonomous vehicle 100, may also be uploaded to mission control computing system 224. The uploaded deposition strategies, statuses, and other data may be used as data for condition evaluations and determination of deposition strategies in the future and by other autonomous vehicles 100 in the fleet. The uploaded data may also be included in the historical data for training a machine learning model.

Accordingly, besides sensor data, systems and methods described herein also use aggregate data and historical data in analyzing conditions and determining de-icing strategies. For example, salt may be difficult to detect using only sensor data. Information and data from other vehicles in the fleet may be used in determining the types of de-icing materials that have been applied and therefore determining whether salt has been previously applied. In another example, the level of iciness on the road may be difficult to detect using only sensor data. Data from other vehicles may be used in determining the iciness, such as the travel trajectories of other vehicles and the de-icing strategies of other vehicles on the same road. Furthermore, historical data may be used to predict the level of iciness of the road using a machine-learning model, where the machine learning model is trained by the historical data.

Figure 5:
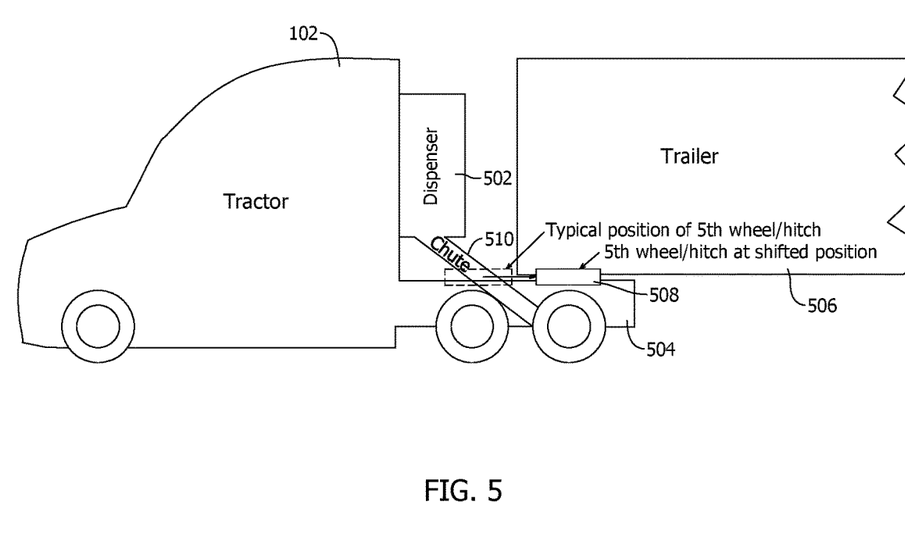
FIG. 5 is a schematic diagram of an example autonomous vehicle including a dispenser for de-icing material.
Figure 6:
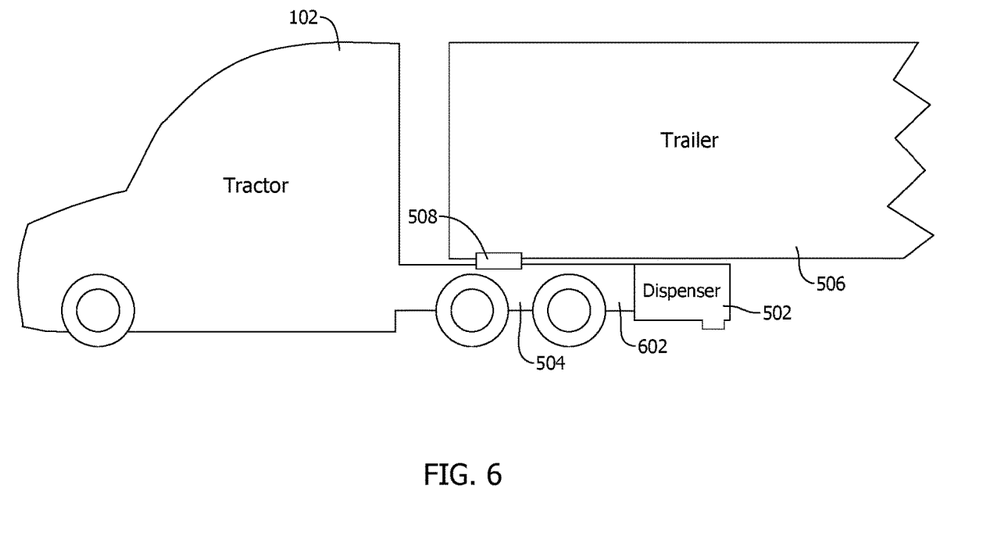
FIG. 6 is a schematic diagram of another example autonomous vehicle including a dispenser for de-icing material.
Figure 7:
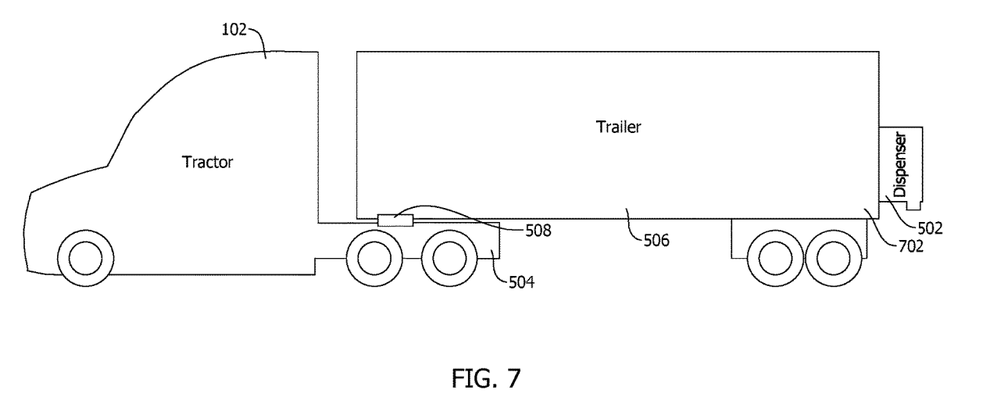
FIG. 7 is schematic diagram of another example autonomous vehicle including a dispenser for de-icing material.

In the example embodiments, autonomous vehicle 100 includes a dispenser installed at various locations of autonomous vehicle 100. FIG. 5 shows a dispenser 502 is installed on a tractor 102 of autonomous vehicle 100. FIG. 6 shows dispenser 502 is installed on a chassis 504 of autonomous vehicle 100. FIG. 7 shows dispenser 502 is installed on a trailer 506 of autonomous vehicle 100.

In one example, dispenser 502 may be installed on tractor 102 (FIG. 5). Dispenser may be fit in a space between tractor 102 and trailer 506. Autonomous vehicle 100 includes a fifth wheel 508, which is part of autonomous vehicle 100 that connects to a kingpin (not shown) of trailer 506. The connection formed between the coupling of fifth wheel 508 and the kingpin facilitate the truck to articulate when turning. Fifth wheel 508 may be adjusted by sliding backward or forward to facilitate proper distribution of trailer weight on chassis 504 of tractor 102. To provide the space for dispenser 502, fifth wheel 508 may be moved further backward than a typical position of fifth wheel 508. Dispenser 502 is coupled with a chute 510, which is directed through recesses in tractor chassis 504. De-icing materials are dispensed through chute 510 onto the roads.

In another example, dispenser 502 is installed at a rear end 602 of chassis 504 (FIG. 6). Dispenser 502 is clear from trailer 506 such that trailer 506 is free to rotate around fifth wheel 508. Installing dispenser 502 at rear end 602 does not involve modification of the hitching position of trailer 506 with fifth wheel 508, reducing complexity of set-up of autonomous vehicle 100 before and/or after hitching of trailer 506.

In one more example, dispenser 502 is installed at a trailer end 702 of trailer 506 (FIG. 7). Dispenser 502 may be attached to trailer 506 after trailer 506 is loaded and locked with chassis 504. Upon completion of transportation, before unloading trailer 506 from autonomous vehicle 100, dispenser 502 may be removed from trailer 506 to access cargo in trailer 506.

In the example embodiments, dispenser 502 may be coupled with tractor 102 and/or trailer 506 via a cable (not shown) such as a 7-pin control area network (CAN)/power cable to be controlled by tractor 102. In some embodiments, dispenser 502 is designed to travel a long distance, where the de-icing materials are loaded at a loading location and deposited at a location different from the loading location.

Systems and methods described herein may be applied to vehicles specialized in de-icing operations, including snowplows and related machinery. For example, autonomous vehicles 100 may be a fleet of autonomous de-icing vehicles implemented with systems and methods described herein. Autonomous vehicle 100 may include a dispenser 502 and have a main purpose of de-icing, where dispenser 502 does not need to be separately attached to and detached from autonomous vehicle 100.

Systems and methods described herein are advantageous in selectively de-icing the roads. Unlike in known de-icing methods, in which the area, timing, frequency, and amount of de-icing material may be fixed, systems and methods described herein select and adjust de-icing strategies based on the sensor data, weather data, fleet data, and road conditions, solving the problem of over- or under-deposition, increasing the efficiencies in de-icing, and solving problems associated with human operators such as costs and availability of human operators.

Figure 8:
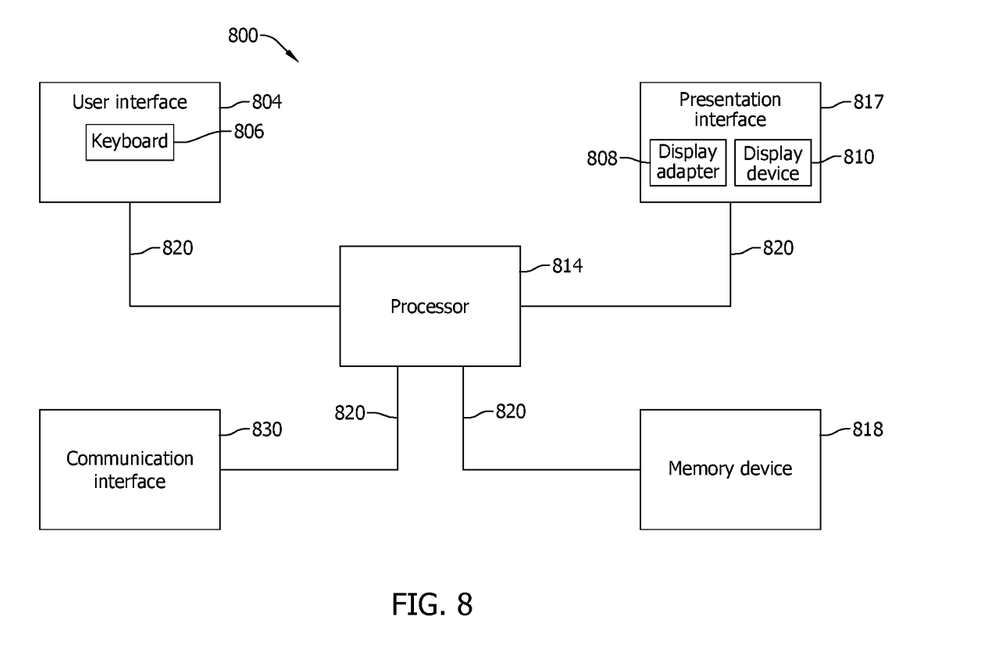
FIG. 8 is a block diagram of an example computing device.

Methods described herein may be implemented on autonomy computing system 204. Autonomy computing system 204 described herein may be any suitable computing device 800 and software implemented therein. FIG. 8 is a block diagram of an example computing device 800.

Computing device 800 includes a processor 814 and a memory device 818. Processor 814 is coupled to user interface 804, presentation interface 817, and memory device 818 via a system bus 820. In the example embodiment, processor 814 communicates with the user, such as by prompting the user via presentation interface 817 and/or by receiving user inputs via user interface 804. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition and/or meaning of the term "processor."

In the example embodiment, memory device 818 includes one or more devices that enable information, such as executable instructions and/or other data, to be stored and retrieved. Moreover, memory device 818 includes one or more computer readable media, such as, without limitation, dynamic random access memory (DRAM), static random access memory (SRAM), a solid state disk, and/or a hard disk. In the example embodiment, memory device 818 stores, without limitation, application source code, application object code, configuration data, additional input events, application states, assertion statements, validation results, and/or any other type of data. Computing device 800, in the example embodiment, may also include a communication interface 830 that is coupled to processor 814 via system bus 820. Moreover, communication interface 830 is communicatively coupled to data acquisition devices.

In the example embodiment, processor 814 may be programmed by encoding an operation using one or more executable instructions and providing the executable instructions in memory device 818. In the example embodiment, processor 814 is programmed to select a plurality of measurements that are received from data acquisition devices.

In operation, a computer executes computer-executable instructions embodied in one or more computer-executable components stored on one or more computer-readable media to implement aspects of the invention described and/or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In certain embodiments, computing device 800 includes a user interface 804 that receives at least one input from a user. User interface 804 may include a keyboard 806 that enables the user to input pertinent information. User interface 804 may also include, for example, a pointing device, a mouse, a stylus, a touch sensitive panel (e.g., a touch pad and a touch screen), a gyroscope, an accelerometer, a position detector, and/or an audio input interface (e.g., including a microphone). Moreover, computing device 800 includes a presentation interface 817 that presents information, such as input events and/or validation results, to the user. Presentation interface 817 may also include a display adapter 808 that is coupled to at least one display device 810. More specifically, in the example embodiment, display device 810 may be a visual display device, such as a cathode ray tube (CRT), a liquid crystal display (LCD), a light-emitting diode (LED) display, and/or an "electronic ink" display. Alternatively, presentation interface 817 may include an audio output device (e.g., an audio adapter and/or a speaker) and/or a printer.

Figure 9:
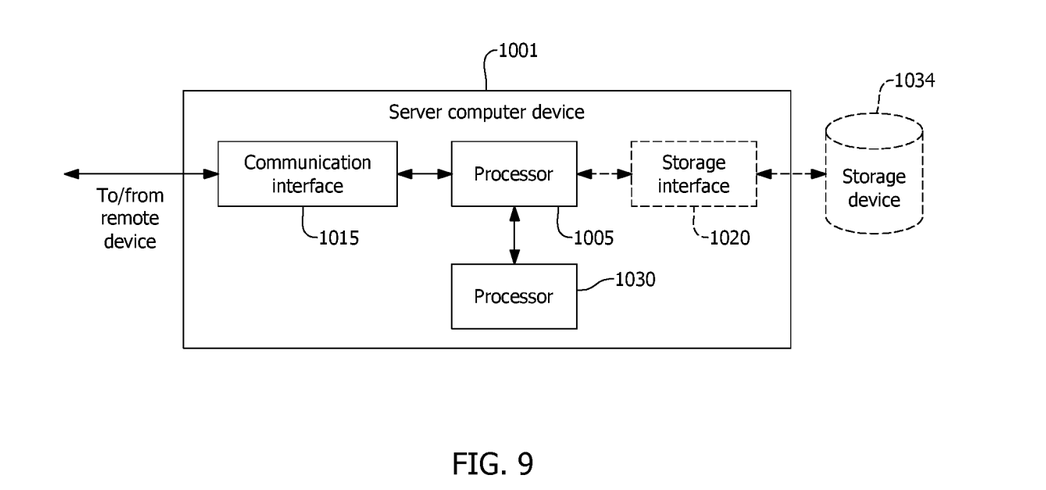
FIG. 9 is a block diagram of an example server computing device.

FIG. 9 illustrates an example configuration of a server computer device 1001 such as mission control computing system 224. Server computer device 1001 also includes a processor 1005 for executing instructions. Instructions may be stored in a memory area 1030, for example. Processor 1005 may include one or more processing units (e.g., in a multi-core configuration).

Processor 1005 is operatively coupled to a communication interface 1015 such that server computer device 1001 is capable of communicating with a remote device or another server computer device 1001. For example, communication interface 1015 may receive data from autonomy computing system 204 or sensors 206, via the Internet or wireless communication.

Processor 1005 may also be operatively coupled to a storage device 1034. Storage device 1034 is any computer-operated hardware suitable for storing and/or retrieving data. In some embodiments, storage device 1034 is integrated in server computer device 1001. For example, server computer device 1001 may include one or more hard disk drives as storage device 1034. In other embodiments, storage device 1034 is external to server computer device 1001 and may be accessed by a plurality of server computer devices 1001. For example, storage device 1034 may include multiple storage units such as hard disks and/or solid state disks in a redundant array of independent disks (RAID) configuration. storage device 1034 may include a storage area network (SAN) and/or a network attached storage (NAS) system.

In some embodiments, processor 1005 is operatively coupled to storage device 1034 via a storage interface 1020. Storage interface 1020 is any component capable of providing processor 1005 with access to storage device 1034. Storage interface 1020 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1005 with access to storage device 1034.

An example technical effect of the methods, systems, and apparatus described herein includes at least one of: (a) an autonomous vehicle configured to determine and adjust de-icing strategies based on meteorological data and sensor data from the autonomous vehicle; (b) methods of de-icing using a fleet of autonomous vehicles; or (c) methods of de-icing based on aggregate and/or historical data.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processors, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable, and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. An autonomous vehicle, comprising:
one or more sensors; and
an autonomy computing system, comprising at least one processor in communication with at least one memory device, and the at least one processor programmed to:
receive sensor data from the one or more sensors;
receive weather-related data from a mission control computing system, wherein the weather-related data include fleet data from autonomous vehicles in a fleet, the fleet including the autonomous vehicle;
determine an icy condition is present based on the sensor data and the fleet data;
determine de-icing strategies based on the icy condition;
determine whether deposition of de-icing materials is warranted;
select a lane for the autonomous vehicle to travel on when deposition of de-icing materials is warranted, the lane having a higher level of iciness than other lanes; and
control dispensing of de-icing materials based on the de-icing strategies.

2. The autonomous vehicle of claim 1, wherein the at least one processor is further programmed to:
determine a de-icing material on a road based on the fleet data.

3. The autonomous vehicle of claim 2, wherein the at least one processor is further programmed to determine whether the de-icing material is salt based on the fleet data.

4. The autonomous vehicle of claim 2, wherein the at least one processor is further programmed to determine whether the de-icing material is sand based on the fleet data.

5. The autonomous vehicle of claim 1, wherein the at least one processor is further programmed to determine whether to select salt and/or sand based on the fleet data and/or the sensor data.

6. The autonomous vehicle of claim 1, wherein the at least one processor is further programmed to:
receive meteorological data; and
updating the de-icing strategies based on the meteorological data.

7. The autonomous vehicle of claim 1, wherein the at least one processor is further programmed to:
determine a level of iciness based on a machine learning model, wherein the machine learning model is trained by historical data and configured to determine the level of iciness based on the sensor data.

8. The autonomous vehicle of claim 1, further comprising a dispenser, wherein the at least one processor is further programmed to:
activate dispensing of de-icing materials from the dispenser based on the de-icing strategies.

9. The autonomous vehicle of claim 1, wherein the sensor data include light detection and ranging (LiDAR) data, and the at least one processor is further programmed to:
determine whether an icy condition is present using the LiDAR data based on reflection and/or absorption properties of light by snow and/or ice and/or geometrical distribution of the light.

10. An autonomy computing system of an autonomous vehicle, comprising at least one processor in communication with at least one memory device, and the at least one processor programmed to:
receive sensor data from one or more sensors of the autonomous vehicle;
receive weather-related data from a mission control computing system, wherein the weather-related data include fleet data from autonomous vehicles in a fleet, the fleet including the autonomous vehicle;
determine an icy condition is present based on the sensor data and the fleet data;
determine de-icing strategies based on the icy condition;
determine whether deposition of de-icing materials is warranted;
selecting a lane for the autonomous vehicle to travel on when deposition of de-icing materials is warranted, the lane having a higher level of iciness than other lanes; and
control dispensing of de-icing materials based on the de-icing strategies.

11. The autonomy computing system of claim 10, wherein the at least one processor is further programmed to:
determine a de-icing material on a road based on the fleet data.

12. The autonomy computing system of claim 11, wherein the at least one processor is further programmed to determine whether the de-icing material is salt based on the fleet data.

13. The autonomy computing system of claim 11, wherein the at least one processor is further programmed to determine whether the de-icing material is sand based on the fleet data.

14. The autonomy computing system of claim 10, wherein the at least one processor is further programmed to determine whether to select salt and/or sand based on the fleet data and/or the sensor data.

15. The autonomy computing system of claim 10, wherein the at least one processor is further programmed to:
determine a level of iciness of a road based on historical data.

16. A method of de-icing roads using an autonomous vehicle, comprising:
receiving sensor data from one or more sensors of the autonomous vehicle;
receiving weather-related data from a mission control computing system, wherein the weather-related data include fleet data from autonomous vehicles in a fleet, the fleet including the autonomous vehicle;
determining an icy condition is present based on the sensor data and the fleet data, determining the icy condition is present further comprising:
determining a de-icing material on a road based on the fleet data;
determining de-icing strategies based on the icy condition; and
controlling dispensing of de-icing materials based on the de-icing strategies.

17. The method of claim 16, wherein determining the de-icing material further comprises determining whether the de-icing material is salt based on the fleet data.

18. The method of claim 16, wherein determining the de-icing material further comprises determining whether the de-icing material is sand based on the fleet data.

19. The method of claim 16, wherein determining the de-icing strategies further comprises determining whether to select salt and/or sand based on the fleet data and/or the sensor data.

20. The method of claim 16, wherein:
receiving the weather-related data further comprises receiving meteorological data; and
updating the de-icing strategies based on the meteorological data.

21. The method of claim 16, further comprising:
receiving, via an online portal, a de-icing request; and
transmitting a status relating to the de-icing request.

* * * * *